United States Patent
Ye

(10) Patent No.: US 8,381,011 B2
(45) Date of Patent: Feb. 19, 2013

(54) ADJUSTING PERIOD OF CLOCK INTERRUPTION THAT TRIGGERS PROCESSING OF PROCESSES IN RUN QUEUE AT PLURAL THRESHOLD DEPTH LEVELS

(75) Inventor: Yanzhong Ye, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/345,042

(22) Filed: Jan. 6, 2012

(65) Prior Publication Data

US 2012/0221756 A1    Aug. 30, 2012

Related U.S. Application Data

(63) Continuation of application No. PCT/CN2011/080577, filed on Oct. 9, 2011.

(30) Foreign Application Priority Data

Feb. 24, 2011    (CN) .......................... 2011 1 0044965

(51) Int. Cl.
*G06F 1/08* (2006.01)
(52) U.S. Cl. ........................................... 713/501
(58) Field of Classification Search .................. None
See application file for complete search history.

(56) References Cited

U.S. PATENT DOCUMENTS

| 6,763,476 | B1 |   | 7/2004  | Dangi et al. |
| 6,820,263 | B1 | * | 11/2004 | Klappholz ..................... 718/108 |
| 7,634,589 | B2 | * | 12/2009 | Anand et al. .................... 710/15 |

FOREIGN PATENT DOCUMENTS

| CN | 101853066 A  | 10/2010 |
| CN | 102081555 A  | 6/2011  |
| JP | 2008305351 A | 12/2008 |

OTHER PUBLICATIONS

International Search Report and Written Opinion of the International Searching Authority issued in corresponding PCT Patent Application No. PCT/CN2011/080577, mailed Dec. 22, 2011.
Office Action issued in corresponding Chinese Patent Application No. 201110044965.7, mailed May 4, 2012.

* cited by examiner

*Primary Examiner* — Kenneth Kim
(74) *Attorney, Agent, or Firm* — Brinks Hofer Gilson & Lione

(57) ABSTRACT

The present application relates to a method and an apparatus for adjusting a period of clock interruption. The method comprises: determining a number of processes in a run-queue of a processor; and determining the period of clock interruption for use in a run state of the processor such that the period of clock interruption for use when the number of the processes is greater than a reference threshold is less than the period of clock interruption for use when the number of the processes is not greater than the reference threshold. The apparatus comprises a first determination block and a second determination block. With the method and apparatus according to the embodiment of the application, it is possible to dynamically adjust the period of clock interruption such that the period of clock interruption for use in the run state of the processor can be changed according to needs with flexibility.

8 Claims, 3 Drawing Sheets

ADJUSTING PERIOD OF CLOCK INTERRUPTION THAT TRIGGERS PROCESSING OF PROCESSES IN RUN QUEUE AT PLURAL THRESHOLD DEPTH LEVELS

CROSS-REFERENCE TO RELATED APPLICATIONS

This application is a continuation of International Application No. PCT/CN2011/080577, filed on Oct. 9, 2011, which claims priority to Chinese Patent Application No. 201110044965.7, filed on Feb. 24, 2011, which is incorporated by reference in its entirety.

FIELD OF THE APPLICATION

The present application relates to the field of system management, particularly to a method and an apparatus for adjusting a period of a clock interruption.

BACKGROUND OF THE APPLICATION

Clock interruption is a trigger for an operating system and associated with processing and scheduling of various tasks. The system can make statistics on load and time of processes, and enable switching of processes by means of clock interruption. A higher clock pulse rate means a shorter period of clock interruption, enabling timely scheduling of processes and rendering better interaction and higher response speed of the system. Nevertheless, with increase of the clock rate, the core overhead increases to impair the performance of the system and some of processes with a large amount of computation cannot be processed in time. Therefore, it is extremely important to select an appropriate clock rate for an operating system.

In the state of art, the system operates with a fixed period of clock interruption at a fixed clock rate configured by a user after it starts up. That is, a processor, such as, a central processing unit, processes its run-queue at a fixed period of clock interruption regardless of the number of the processes in the run-queue. The processes to be processed by the processor can be stored in the run-queue. Even if a tickless function in a dynamical clock mode is enabled in the system, the system will change the period of the clock interruption to infinity or a significantly large value to stop the clock interruption of the processor when the processor enters an idle state. When the processor is in a run state as a non-idle state, the processor will process the processes at the fixed period of clock interruption.

A fixed period of clock interruption in the run state poses a series of problems, for example, adverse effect on the speed of process scheduling, reduced response time of the system, or waste of hardware sources, due to lack of flexibility. As a result, the processing efficiency of the system is degraded.

SUMMARY OF THE APPLICATION

The embodiments of the application provide a method and an apparatus for adjusting a period of clock interruption to dynamically adjust the period of the clock interruption to improve the processing efficiency of the system, rendering flexibility of the period of the clock interruption in the run state of the processor which should have been fixed.

In an aspect, an embodiment of the application provides a method for adjusting a period of clock interruption, comprising: determining a number of processes in a run-queue of a processor; and determining the period of the clock interruption for use in a run state of the processor such that the period of the clock interruption for use when the number of the processes is greater than a reference threshold is less than the period of the clock interruption for use when the number of the processes is not greater than the reference threshold.

In another aspect, an embodiment of the application provides an apparatus for adjusting a period of clock interruption, comprising: a first determination block operable to determine a number of processes in a run-queue of a processor; and a second determination block operable to determine the period of the clock interruption for use in a run state of the processor such that the period of the clock interruption for use when the number of the processes is greater than a reference threshold is less than the period of the clock interruption for use when the number of the processes is not greater than the reference threshold.

With the above-described arrangements, it is possible to determine the period of the clock interruption for use in the run state of the processor from the number of processes, so that the period of the clock interruption for use when the number of processes is greater than the reference threshold, is less than that when the number of processes is not greater than the reference threshold. In contrast to the state of art in which a fixed period of clock interruption is used, it is capable to dynamically adjust the period of the clock interruption in the run state of the processor such that the period of the clock interruption for use in the run state of the processor can be changed according to needs with flexibility. Furthermore, it is possible to increase the response speed by using a shorter period of clock interruption when the number of processes is relatively large, and to reduce system overhead caused by the clock interruption and enable sufficient execution of processes by using a longer period of clock interruption when the number of processes is relatively small. As a result, the processing efficiency of the system can be improved.

BRIEF DESCRIPTION OF THE DRAWINGS

Brief description of the drawings is given to describe the embodiments of the application more clearly. Obviously, those drawings are simply presented to illustrate some embodiments of the application. It is possible for those skilled in the art to derive the other drawings from them without any inventive work.

DETAILED DESCRIPTION OF THE EMBODIMENTS

The embodiments of the application will be clearly and sufficiently described with reference to the accompanying drawings. Apparently, the embodiments of the application to be described here are simply some of the embodiments of the application, but not all. Any other embodiments at which a skilled person in the state of art can arrive with the teaching of the described embodiments of the application without inventive work should be regarded as falling within the scope of protection to be claimed by the application.

First, a method 100 for adjusting a period of clock interruption according to an embodiment of the application will be described with reference to FIG. 1.

Figure 1:
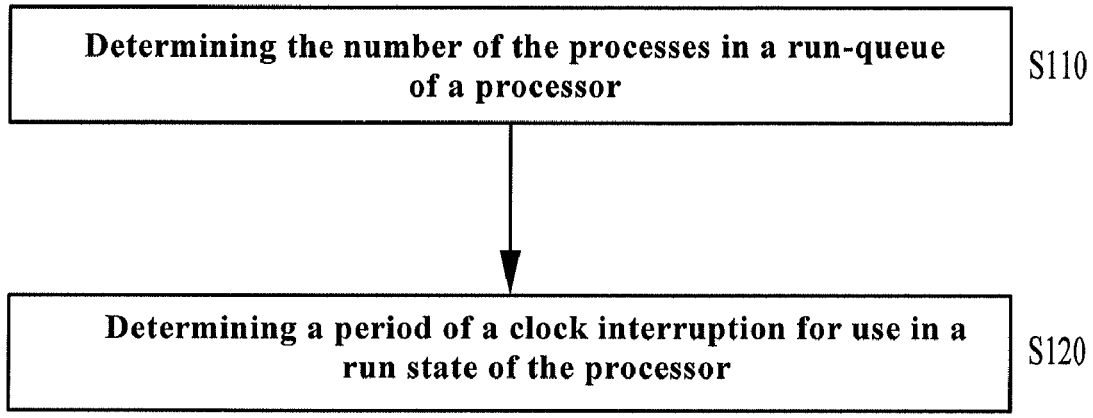
FIG. 1 is a flowchart illustrating a method for adjusting a period of clock interruption according to an embodiment of the application.

As illustrated in FIG. 1, the method 100 comprises: determining a number of processes in a run-queue of a processor in a step S110; and determining a period of clock interruption for use by the processor in a run state such that a period of clock interruption for use when the number of processes is greater than a reference threshold is less than the period of the clock interruption for use when the number of processes is not greater than the reference threshold in a step S120.

The processor can put the processes to be processed into its run-queue and execute the processes in the run-queue by a trigger of clock interruption. At this time, the processor can operate by a trigger of one of at least two periods of clock interruption in the run state of the processor. The number of the processes in the run-queue changes with execution or addition of tasks. The periods of clock interruption for use by the processor in the run state can be determined from the number of the processes in the run-queue so that changeable periods of clock interruption are to be used in the run state.

According to the embodiment, the periods of clock interruption can be changed based on the number of the processes in the run-queue so that the periods of clock interruption are not fixed any longer, but of some flexibility in the run state of the processor so as to dynamically adjust the periods of clock interruption according to needs. Moreover, the period of the clock interruption for use when the number of processes is greater than the reference threshold is shorter than the period of the clock interruption for use when the number of processes is not greater than the reference threshold. This makes it possible to increase the response speed of the system when the number of processes is relatively large to enable the processes to be timely scheduled, and reduce the system overhead caused by clock interruption when the number of processes is relatively small to enable the processes to be sufficiently executed. As a result, it is possible to increase the efficiency of the system.

The steps S110 and S120 according to the embodiment of the application will be described in detail below.

In the step S110, the number of the processes in the run-queue of the processor is determined.

The processor can directly check the number of the processes in its run-queue, or alternatively retrieve the number of the processes in the run-queue from a table by reading the table in which information on the run-queue is recorded.

The number of the processes in the run-queue can be determined at predetermined time intervals. The predetermined time intervals may be equal, for example, 1 second, 2 seconds or the like, or unequal. If the predetermined time intervals are unequal, the time interval at which the number of processes is determined next time can be set according to the current number of processes, system load, hardware overhead, etc. Alternatively, a time interval between two immediate determinations of the number of processes may be set randomly.

In the step S120, the period of the clock interruption for use by the processor in the run state is determined such that the period of the clock interruption for use when the number of processes is greater than a reference threshold is less than the period of the clock interruption for use when the number of processes is not greater than the reference threshold.

The period of the clock interruption may be preset or dynamically generated during determination of the period of the clock interruption. The number of processes as determined in the step S110 can be compared with a preset threshold. The period of the clock interruption can be determined depending on the comparison between the number of processes and the threshold. The period of the clock interruption corresponding to the number of processes can be determined by looking up a table in which mapping between the number of processes and the period of the clock interruption is recorded or dynamically generating the period of the clock interruption based on the mapping.

The period of the clock interruption for use by the processor in the run state can be determined such that the period of the clock interruption for use when the number of processes is greater than the reference threshold is less than the period of the clock interruption for use when the number of processes is not greater than the reference threshold. In this situation, one period of clock interruption is required when the number of processes is greater than the reference threshold whereas another period of clock interruption longer than the one period of clock interruption is required when the number of processes is not greater than the reference threshold. That is, the period of the clock interruption in the case that the number of processes is greater than the reference threshold is shorter than that in the case that the number of processes is not greater than the reference threshold. As a result, when the number of processes is relatively large, the processes can be scheduled in time because of a shorter period of clock interruption, rendering a shorter response time. When the number of processes is relatively small, each of the processes can be processed in a longer period with less times of clock interruption because of a longer period of clock interruption so that each of the processes can be scheduled efficiently and therefore executed more sufficiently and the time and source exhaustion necessary for changeover of context information may be decreased. Therefore, the processing efficiency of the system can be improved.

According to an embodiment of the application, the reference threshold(s) may be more than a specific value, and includes at least two thresholds. Multiple thresholds allow more periods of clock interruption such that an appropriate period of clock interruption can be better determined with regard to the processing environment of the system with higher flexibility. According to an embodiment of the application, the reference threshold may include a first threshold and a second threshold larger than the first threshold. When the number of processes is larger than the first threshold but not larger than the second threshold, it is determined to require the first period of clock interruption. When the number of processes is not larger than the first threshold, it is determined to require the second period of clock interruption larger than the first period of clock interruption. When the number of processes is larger than the second threshold, it is determined to require the third period of clock interruption less than the first period of clock interruption. Thus, a period of clock interruption is selected out of the three periods of clock interruption depending on the number of processes. As such, a period of clock interruption trading off the speed of scheduling and the frequency at which the clock interruption occurs is applied to optimize the performance of the system when the number of processes is moderate, the period of the clock interruption decreases to enable timely response to the processes when the number of processes is relatively large, and the period of the clock interruption increases with a premise of a timely response to the processes so as to reduce the time and overhead for saving context information due to clock interruption to enable the scheduled processes to be sufficiently executed. It is possible to satisfy the requirements for response speed and processing performance under various numbers of processes by means of changeable periods of clock interruption, resulting in improvement of the processing efficiency of the system.

With the method for adjusting the period of the clock interruption according to the embodiment of the application, it is possible to determine the period of the clock interruption necessary for use in the run state of the processor. Instead of using a fixed period of clock interruption in the run state of the processor like the state of art, the method according to the embodiment of the application c an dynamically adjust the period of the clock interruption to use different periods of clock interruption according to the needs, resulting in flexibility of the period(s) of clock interruption for use in the run state of the processor. Furthermore, with an arrangement that the period of the clock interruption for use when the number of processes is greater than the reference threshold is less than the period of the clock interruption for use when the number of processes is not greater than the reference threshold, it makes it possible to increase the response speed of the system to enable a timely response to the processes when the number of processes is relatively large and reduce the system overhead due to the clock interruption and enable sufficient execution of the processes when the number of processes is relatively small. Thus, it is possible to improve the processing efficiency of the system.

Figure 2:
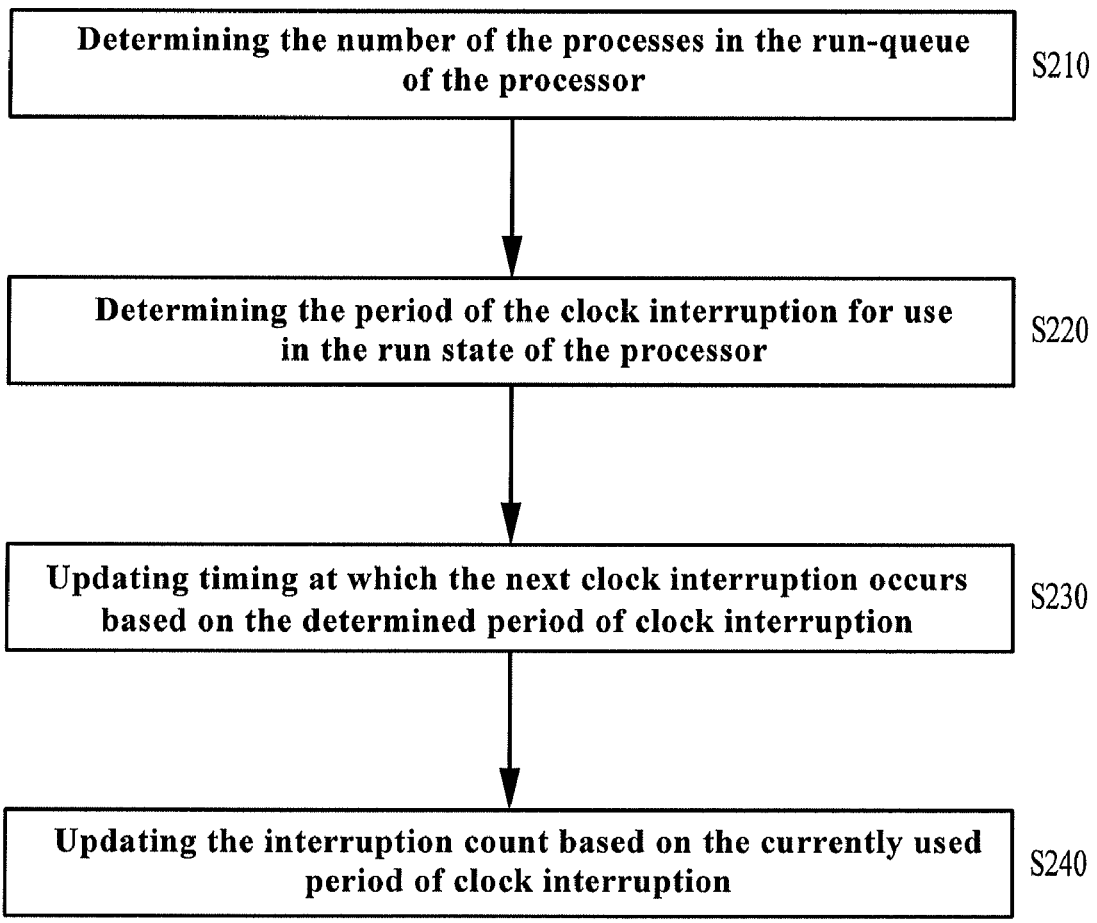
FIG. 2 is a flowchart illustrating another method for adjusting a period of clock interruption according to an embodiment of the application.

FIG. 2 illustrates a method 200 for adjusting a period of clock interruption according to an embodiment of the application.

The steps S210 and S220 in FIG. 2 are substantially the same as the steps S110 and S120 of the method 100 as illustrated in FIG. 1. The description thereof is therefore omitted.

According to an embodiment of the application, the method 200 further includes, subsequent to the step S220, a step S230 for updating timing at which the next clock interruption occurs based on the determined period of clock interruption.

A time interval at which the next clock interruption will be triggered can be determined to update the timing at which the next clock interruption occurs based on the period of the clock interruption as determined in the step S220. For example, assumed that the current period of clock interruption is 1 ms, if the period of the clock interruption for use is determined as 4 ms, the timing at which the next clock interruption occurs would be the timing at which the current clock interruption occurs plus 4 ms, instead of the timing at which the current clock interruption occurs plus 1 ms. Similarly, in this situation, if the period of the clock interruption for use is determined unchanged, a trigger of clock interruption will be generated at a time interval of 1 ms. By updating the timing at which the next clock interruption occurs, it is possible to dynamically adapt the timing at which the clock interruption is triggered to the current number of processes in time.

According to an embodiment of the application, the method 200 further includes, subsequent to the step S220, a step S240 for updating an interruption count of the times for which the clock interruption occurs based on the currently used period of clock interruption.

The times for which the clock interruption occurs are necessary for system management, load statistics, execution of some tasks or the like. Then, it is necessary to update the interruption count of the times for which the clock interruption occurs each time a clock interruption occurs.

At least two periods of clock interruption are necessary in the run state of the processor and characterized by different interruption time. Thus, the interruption count is updated in a way corresponding to each of the periods of clock interruption so as to keep the correspondence between the times of clock interruption and the indicated time of clock interruption such that an interruption count unit corresponds to the same interruption time.

According to an embodiment of the application, the interruption count increases when the currently used period of clock interruption is the reference period of clock interruption for counting the times of clock interruption. When the currently used period of clock interruption is not the reference period of clock interruption, the interruption count increases based on a ratio of the currently used period of clock interruption with regard to the reference period of clock interruption. In this way, the interruption time corresponding to an interruption count unit equals to the reference period of clock interruption. Although the times for which the clock interruption occurs at different periods of clock interruption differ within the same time period, they have the same count within the same time period.

For example, assumed that the reference period of clock interruption for counting the times of clock interruption is 1 ms and the currently used period of clock interruption is 4 ms, the interruption count increases by one when the currently used period of clock interruption is 1 ms, whereas the interruption count increases by four when the currently used period of clock interruption is 4 ms which is four times the reference period of clock interruption. Thus, within the same time period of 20 ms, the clock interruption occurs 20 times and the interruption count increases by twenty if a period of clock interruption of 1 ms is used whereas the clock interruption occurs 5 times and the interruption count still increases by twenty (4×5) if a period of clock interruption of 4 ms is used. As a result, an interruption count unit corresponds to the same interruption time for different periods of clock interruption to keep the consistency of counting.

Figure 3:
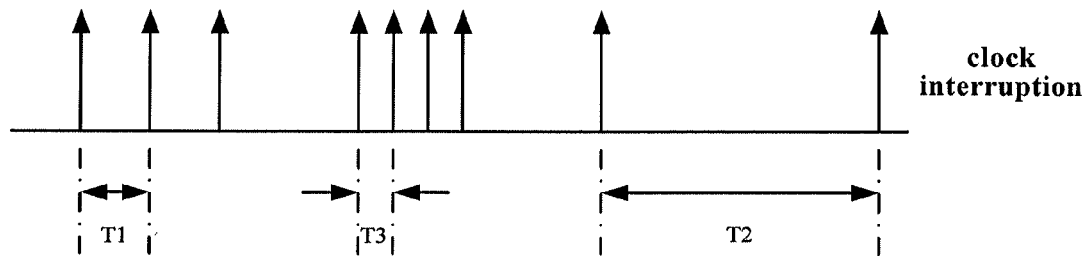
FIG. 3 shows an example in which three periods of clock interruption are used according to an embodiment of the application.

Although a step S240 is performed subsequent to the step S230 in FIG. 3, s person skilled in the art can recognize that the step S240 may be performed before or simultaneously with the step S230. The steps S230 and S240 can be performed in any order, but they must be performed after the step S220.

Description will be made with reference to FIG. 3 on how to adjust the period of the clock interruption for multiple thresholds, taking a case that the reference threshold comprises the first and second thresholds as an example.

In the example as illustrated in FIG. 3, the periods of clock interruption include the first period T1 of clock interruption, the second period T2 of clock interruption and the third period T3 of clock interruption, where T3<T1<T2. The three periods of clock interruption can be preset for a processor and one of them is chosen depending on the number of processes.

The number N of the processes in the run-queue of the processor can be checked every at least one reference period of clock interruption. Checking may be made every a variable number of reference periods of clock interruption. The reference period of clock interruption may be the minimum of T1, T2 and T3, or alternatively less than any one of T1, T2 and T3.

After the number N of processes is acquired, the number N of processes is compared with the first threshold N1 and the second threshold N2, where N1<N2. When N1<N≦N2, the first period T1 of clock interruption is determined for use. When N≦N1, the second period T2 of clock interruption is determined for use. When N>N2, the third period T3 of clock interruption is determined for use. As a result, when the number of processes is relatively large, the rate of clock interruption increases (that is, the period of the clock interruption decreases) to execute the processes at a shorter period T3 of clock interruption so that every task can be scheduled in time to increase the response speed of the system. When the number of processes is relatively small, the rate of clock interruption decreases (that is, the period of the clock interruption increases) to execute the processes at a longer period T2 of clock interruption such that the times of clock interruption can be reduced to improve the efficiency of task execution by the processor while ensuring that every task is timely scheduled.

After the period of the clock interruption for use is determined, the timing at which the next clock interruption occurs can be updated. If the period of the clock interruption for use is T1, T2 or T3, the timing at which the next clock interruption occurs will be updated to the timing of the current clock interruption plus T1, T2 or T3, respectively. If the period of the clock interruption keeps unchanged, the timing at which the next clock interruption occurs will be updated based on the currently used period of clock interruption.

After the period of the clock interruption for use is determined, the interruption count may be also updated. Assumed that T2=10T3 and T1=4T3, T3 may be taken as the reference period of clock interruption. If the period T1 of clock interruption is currently used, the interruption count increases by four every time the clock interruption occurs. If the period T2 of clock interruption is currently used, the interruption count increases by ten every time the clock interruption occurs. If the period T3 of clock interruption is currently used, the interruption count increases by one every time the clock interruption occurs. This ensures that increment by one of the interruption count corresponds to a period of time T2.

Figure 4:
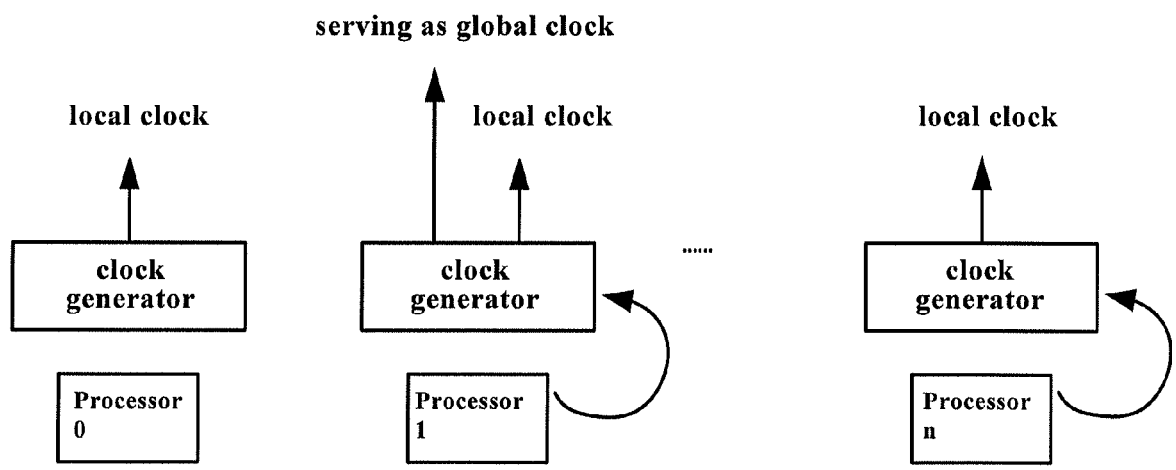
FIG. 4 shows an example in which the period of the clock interruption is adjusted in a multiple-CPU scenario according to an embodiment of the application.

The embodiment of the application can be applied to either a single-processor system or a multiple-processor system. In a multiple-processor system, the method for adjusting a period of clock interruption according to the embodiment of the application can be applied for individual processors. FIG. 4 illustrates an example of adjusting the period of the clock interruption in a multiple-processor scenario according to an embodiment of the application.

The system as shown in FIG. 4 includes a plurality of processors 0, 1, ..., n. The system of FIG. 4 may be a high-resolution or tickless enabled system. Each of the processors in the system has a respective clock generator for generating a local clock interruption trigger and executes the processes in the run-queue of the processor based on the local clock generator. The clock generator of each processor generates a local clock to control the corresponding processor to execute the processes based on the local clock. Any of the local clocks can serve as a global clock. For example, in FIG. 4, the local clock of the processor 1 serves as the global clock. Then, when the local clock of the processor 1 changes its period of clock interruption, the period of the clock interruption of the global clock of the system will be changed.

In a multiple-processor system, all or part of the processors can operate at a changeable period of clock interruption. For example, in FIG. 4, the processors 1 through n can operate at changeable periods of clock interruption. At this time, for each of the processors 1 through n, it is necessary to update the timing at which the next clock interruption occurs so that the corresponding clock generator can generate a clock interruption trigger for the processor's operation based on the updated timing at which the next clock interruption occurs.

Also, it is possible to update the interruption count by a specific processor, or update respective interruption counts by multiple processors. Generally, the processor under control of the local clock serving as the global clock serves to update the interruption count during the processing routine of global clock interruption. For example, in FIG. 4, the processor 1 may serve to update the interruption count. The local clocks of the other processors are not used to update the interruption count after the local clock interruption is generated, but mainly used to calculate the execution time of the processes. It is recognizable for a skilled person in the art that more than one processor needs to maintain their own specific interruption counts for sake of system management. At this time, those processors need to update their respective interruption counts by using their respective local clocks.

Additionally, in a multiple-processor system, it is also possible to set different local periods of clock interruption for the multiple processors. An interactive process that needs interaction with the user, such as, keyboard input, mouse input, etc, can be bound with a processor or a set of processors having a shorter period of clock interruption so as to satisfy the high response speed necessary for the interactive process. A batch process that entails a large amount of computation and long-term occupation of the processor can be bound with a processor or a set of processors having a longer period of clock interruption so as to satisfy the high computation performance by reducing the times of clock interruption.

The method for adjusting the period of the clock interruption according to the embodiment of the application has been described above. Next, a structural diagram of an apparatus for adjusting a period of clock interruption according to an embodiment of the application will be described with reference to FIGS. 5 and 6.

Figure 5:
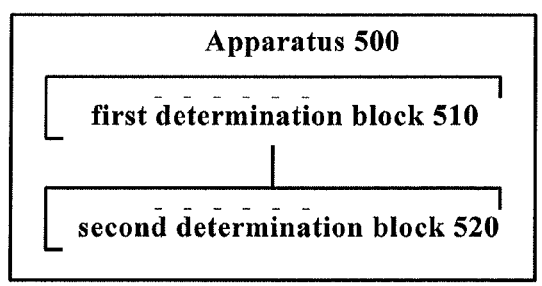
FIG. 5 illustrates a structural diagram of an apparatus for adjusting a period of clock interruption according to an embodiment of the application.

FIG. 5 illustrates a structural diagram of an apparatus 500 for adjusting a period of clock interruption according to an embodiment of the application.

The apparatus 500 comprises a first determination block 510 and a second determination block 520. The first determination block 510 is operable to determine the number of the processes in the run-queue of the processor. The second determination block 520 is operable to determine the period of the clock interruption for use in the run state of the processor such that the period of the clock interruption for use when the number of processes is greater than a reference threshold is less than the period of the clock interruption for use when the number of processes is not greater than the reference threshold.

The above-described and other operations and/or functions of the first determination block 510 and the second determination block 520 of the apparatus 500 may be learnt by referring to the corresponding parts of the method(s) 100 and/or 200 for adjusting the period of the clock interruption. The description thereof is omitted to avoid redundancy.

With the apparatus for adjusting the period of the clock interruption according to the embodiment of the application, the second determination block can determine the period of the clock interruption for use in the run state of the processor according to the number of processes determined by the first determination block. Thus, in contrast to the state of art in which a fixed period of clock interruption is used in the run state of the processor, it is possible to dynamically adjust the period of the clock interruption such that the period of the clock interruption for use in the run state of the processor can be changed according to needs with flexibility. With the second determination block, the period of the clock interruption for used when the number of processes is greater than the reference threshold is less than the period of the clock interruption for use when the number of processes is not greater than the reference threshold. As such, it is possible to increase the response speed to enable timely scheduling of the processes when the number of processes is relatively large, and to reduce system overhead caused by the clock interruption and enable sufficient execution of processes when the number of processes is relatively small. As a result, the processing efficiency of the system can be improved.

Figure 6:
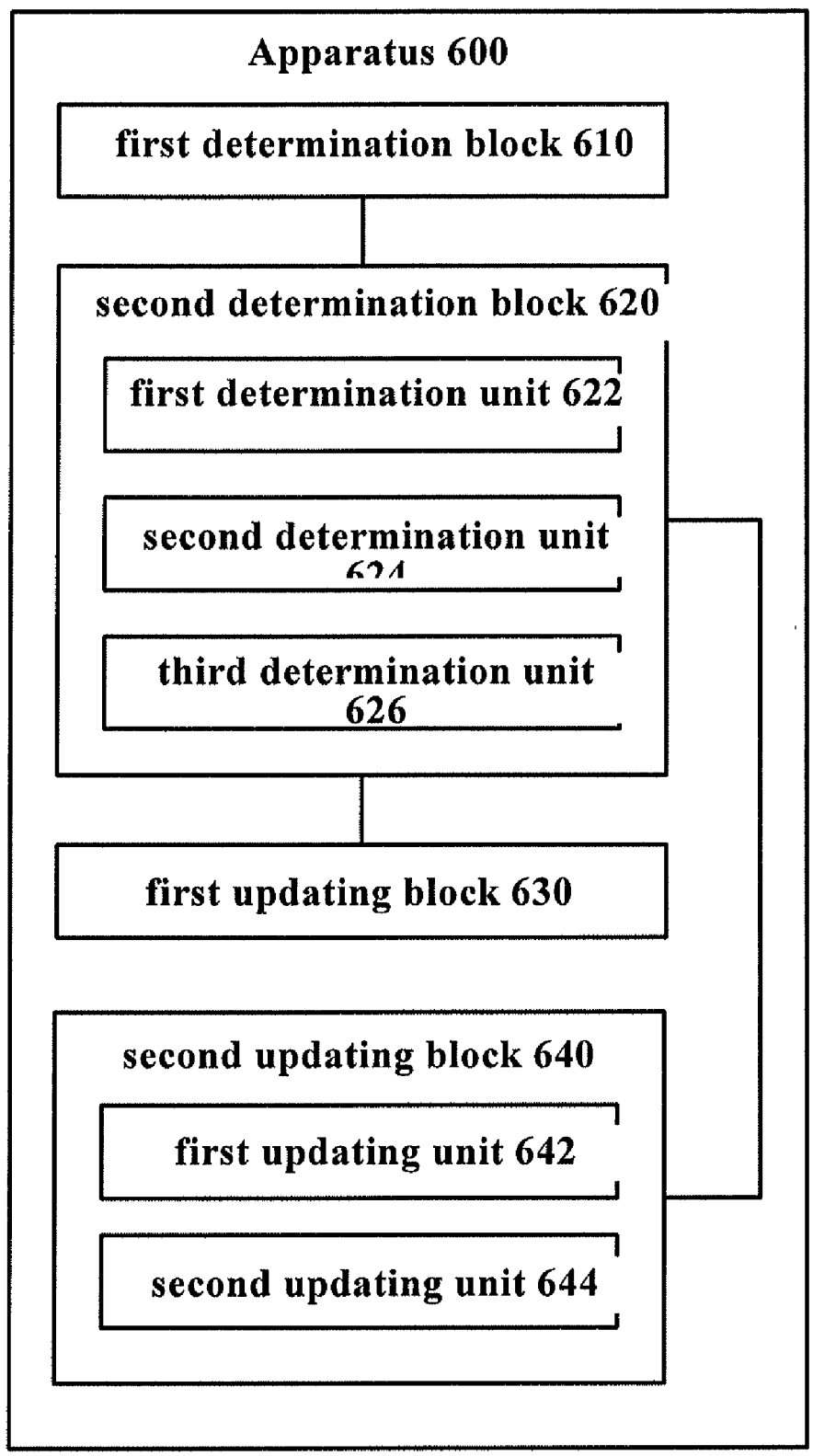
FIG. 6 illustrates a structural diagram of another apparatus for adjusting a period of clock interruption according to an embodiment of the application.

FIG. 6 illustrates a structural diagram of an apparatus 600 for adjusting a period of clock interruption according to an embodiment of the application. The first determination block 610 and the second determination block 620 of the apparatus 600 operate basically the same as the first determination block 510 and the second determination block 520 of the apparatus 500 as shown in FIG. 5.

According to an embodiment of the application, the reference threshold may comprise a first threshold and a second threshold greater than the first threshold. In this case, the second determination block 620 may comprise a first determination unit 622, a second determination unit 624 and a third determination unit 626. The first determination unit 622 is operable to determine a first period of clock interruption for use when the number of processes is greater than the first threshold and not greater than the second threshold. The second determination unit 624 is operable to determine a second period of clock interruption larger than the first period of clock interruption for use when the number of processes is not greater than the first threshold. The third determination unit 626 is operable to determine a third period of clock interruption less than the first period of clock interruption for use when the number of processes is greater than the second threshold.

The above-described and other operations and/or functions of the first determination unit 622, the second determination unit 624 and the third determination unit 626 may be learnt by referring to the corresponding parts of the method(s) 100 and/or 200 for adjusting the period of the clock interruption. The description thereof is omitted to avoid redundancy.

According to an embodiment of the application, the apparatus 600 may further comprise a first updating block 630. The first updating block 630 is operable to update timing at which the next clock interruption occurs based on the determined period of clock interruption.

The above-described and other operations and/or functions of the first updating block 630 may be learnt by referring to the corresponding parts of the method(s) 100 and/or 200 for adjusting the period of the clock interruption. The description thereof is omitted to avoid redundancy. With the first updating block, it is possible to adjust the period of the clock interruption in time so as to change the timing at which the clock interruption is triggered in time.

According to an embodiment of the application, the apparatus 600 may further comprise a second updating block 640. The second updating block 640 is operable to update the interruption count indicating the times for which the clock interruption occurs based on the currently used period of clock interruption.

According to an embodiment of the application, the second updating block 640 may comprise a first updating unit 642 and a second updating unit 644. The first updating unit 642 is operable to increase the interruption count when the currently used period of clock interruption is the reference period of clock interruption for counting the times of clock interruption. The second updating unit 644 is operable to increase the interruption count based on a ratio of the currently used period of clock interruption with regard to the reference period of clock interruption when the currently used period of clock interruption is not the reference period of clock interruption.

The above-described and other operations and/or functions of the second updating block 640, the first updating unit 642 and the second updating unit 644 may be learnt by referring to the corresponding parts of the method(s) 100 and/or 200 for adjusting the period of the clock interruption. The description thereof is omitted to avoid redundancy.

With the second updating block, it is possible to supply the parameters necessary for system management, computation of load and execution of tasks. With the first and second updating units, it is possible to achieve consistency of the interruption count for different periods of clock interruption so that a unit of interruption count corresponds to the same interruption time.

A skilled person in the art would appreciate that the steps of the method(s) and the individual elements as described with reference to the embodiment(s) of the application are implementable in electronic hardware, computer software or combination thereof. The steps and configurations of the embodiments are generally described above in terms of function to clarify the interchangeability of hardware and software. Whether the functions are carried out in hardware or software depends on the specific application and the design restriction of the technical solution. It is recognizable for a skilled person in the art to use different methods to carry out the functions for any specific application, which may not be construed as limitation to the scope of protection of the application.

The methodological steps as described with reference to the embodiment(s) of the application can be implemented in hardware, software program for execution by a processor, or combination thereof. The computer program can be set in Random Access Memory (RAM), memory, Read Only Memory (ROM), Electrically Erasable Programmable ROM, Register, hard disk, removable magnetic disk, CD-ROM or any other storage media well known in the relevant art.

Although some of the embodiments of the application are illustrated and described here, it would be appreciated that any modification to the embodiments should fall within the scope of the application without departing from the principle and spirit of the application.

What is claimed is:

1. A method for adjusting a period of a clock interruption, comprising:
    determining a number of processes in a run-queue of a processor; and
    adjusting, directly based on the determined number of processes, the period of the clock interruption for use in a run state of the processor such that a first period of the clock interruption for use when the number of the processes is greater than a reference threshold is less than a second period of the clock interruption for use when the number of the processes is not greater than the reference threshold,
    wherein the processor executes the processes in the run-queue by a trigger of the clock interruption,
    wherein the reference threshold comprises a first threshold and a second threshold greater than the first threshold, and
    wherein the adjusting the period of the clock interruption for use in the run state of the processor comprises:
        determining the first period of the clock interruption for use when the number of the processes is greater than the first threshold and not greater than the second threshold;
        determining the second period of the clock interruption larger than the first period of clock interruption for use, when the number of the processes is not greater than the first threshold; and determining a third period of clock interruption less than the first period of clock interruption for use when the number of the processes is greater than the second threshold.

2. The method according to claim 1, further comprising:
updating timing at which a next clock interruption occurs base on the determined period of clock interruption.

3. The method according to claim 1, further comprising:
updating an interruption count indicating times for which the clock interruption occurs base on a currently used period of clock interruption.

4. The method according to claim 3, wherein the updating an interruption count indicating times for which the clock interruption occurs based on a currently used period of clock interruption comprises:
increasing the interruption count when the currently used period of clock interruption is a reference period of clock interruption for counting the times for which the clock interruption occurs; and
increasing the interruption count base on a ratio of the currently used period of clock interruption with regard to the reference period of clock interruption, when the currently used period of clock interruption is not the reference period of clock interruption.

5. An apparatus for adjusting a period of clock interruption, comprising:
a first determination block operable to determine a number of processes in a run-queue of a processor; and
a second determination block operable to adjust, directly based on the determined number of processes, the period of the clock interruption for use in a run state of the processor such that a first period of the clock interruption for use when the number of the processes is greater than a reference threshold is less than a second period of the clock interruption for use when the number of the processes is not greater than the reference threshold,
wherein the processor executes the processes in the run-queue by a trigger of the clock interruption,
wherein the reference threshold comprises a first threshold and a second threshold greater than the first threshold, and
wherein the second determination block comprises:
a first determination unit operable to determine the first period of clock interruption for use when the number of the processes is greater than the first threshold and not greater than the second threshold;
a second determination unit operable to determine the second period of clock interruption larger than the first period of clock interruption for use when the number of the processes is not greater than the first threshold; and
a third determination unit operable to determine a third period of clock interruption less than the first period of clock interruption for use when the number of the processes is greater than the second threshold.

6. The apparatus according to claim 5, further comprising:
a first updating block operable to update timing at which a next clock interruption occurs based on the determined period of clock interruption.

7. The apparatus according to claim 5, further comprising:
a second updating block operable to update an interruption count indicating times for which the clock interruption occurs based on a currently used period of clock interruption.

8. The apparatus according to claim 7, wherein the second updating block comprises:
a first updating unit operable to increase the interruption count when the currently used period of clock interruption is a reference period of clock interruption for counting the times for which the clock interruption occurs; and
a second updating unit operable to increase the interruption count based on a ratio of the currently used period of clock interruption with regard to the reference period of clock interruption when the currently used period of clock interruption is not the reference period of clock interruption.

* * * * *